United States Patent [19]

Yanagawa

[11] Patent Number: 4,880,009
[45] Date of Patent: Nov. 14, 1989

[54] ULTRASONIC IMAGING APPARATUS
[75] Inventor: Yutaka Yanagawa, Tokyo, Japan
[73] Assignee: Olympus Optical Co., Ltd., Tokyo, Japan
[21] Appl. No.: 85,544
[22] Filed: Aug. 14, 1987
[30] Foreign Application Priority Data
  Aug. 15, 1986 [JP] Japan .................. 61-191441
[51] Int. Cl.⁴ .............................................. A61B 8/00
[52] U.S. Cl. ........................... 128/660.09; 128/662.06
[58] Field of Search .............................. 128/660-661, 128/660.07-661.01, 662.06; 73/618-620, 625-626

[56] References Cited
U.S. PATENT DOCUMENTS

| | | | |
|---|---|---|---|
| 4,231,373 | 11/1980 | Waxman et al. | 128/660 |
| 4,233,988 | 11/1980 | Dick et al. | 128/660 |
| 4,287,767 | 9/1981 | Kretz | 128/660 X |
| 4,374,525 | 2/1983 | Boba | 128/660 |
| 4,383,447 | 5/1983 | Kretz | 128/660 X |
| 4,413,521 | 11/1983 | Van Kamenade | 128/660 |

FOREIGN PATENT DOCUMENTS

| | | | |
|---|---|---|---|
| 3047177 | 9/1981 | Fed. Rep. of Germany . | |
| 3537904 | 4/1986 | Fed. Rep. of Germany . | |
| 61-11026 | 1/1986 | Japan | 128/662.05 |
| 59-13106 | 1/1986 | Japan | 128/660 |

Primary Examiner—Francis Jaworski
Attorney, Agent, or Firm—Ladas & Parry

[57] ABSTRACT

An ultrasonic imaging apparatus has an ultrasonic transducer constituted by a plurality of ultrasonic transducer elements which are selectively switched, a pulser for supplying drive pulses to the selected transducer element, a processing circuit for signal-processing an echo signal output from the transducer and outputting the processed signal as image data, and a memory for storing the image data obtained by the signal processing circuit. The memory is connected to an address circuit for determining a writing start address in accordance with the selected transducer element.

10 Claims, 6 Drawing Sheets

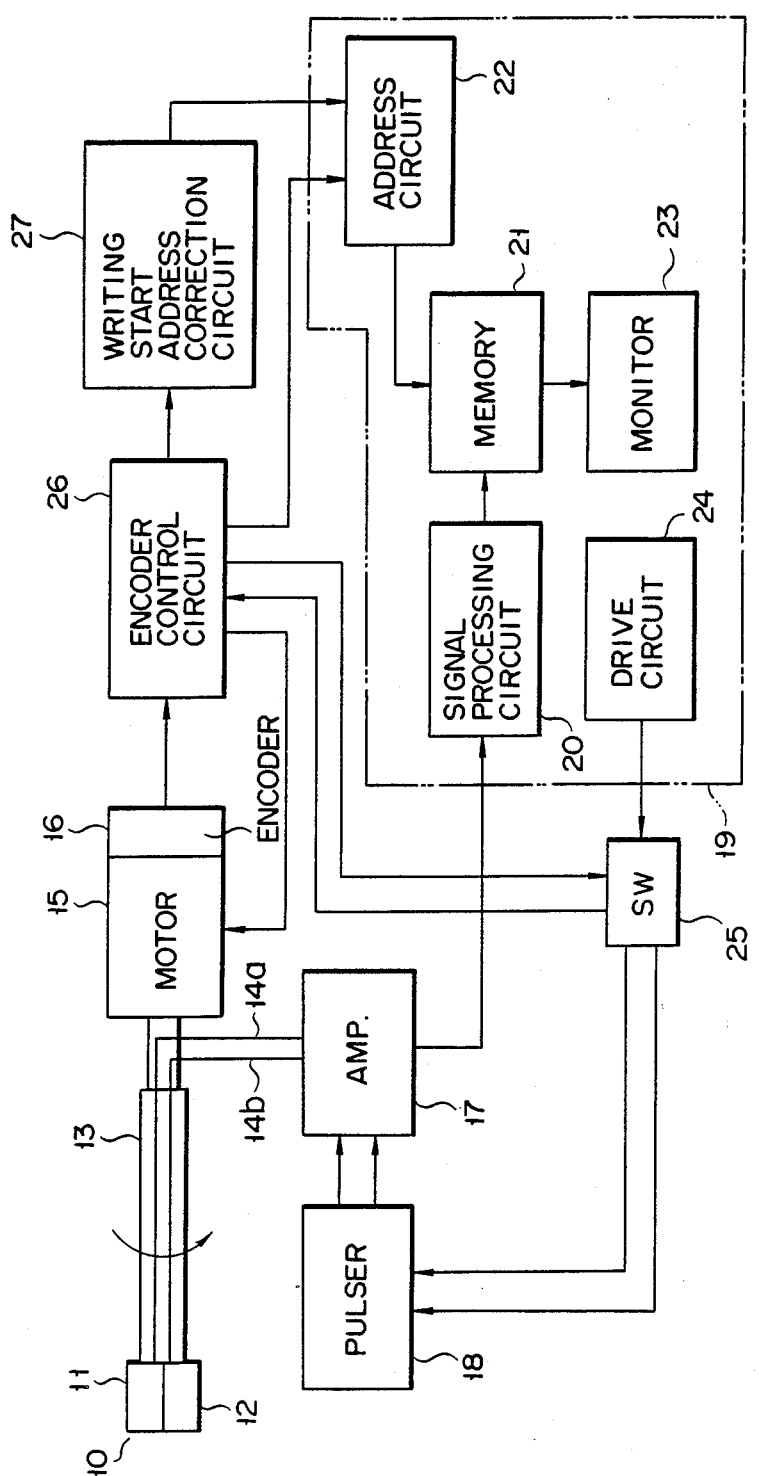
F I G. 1

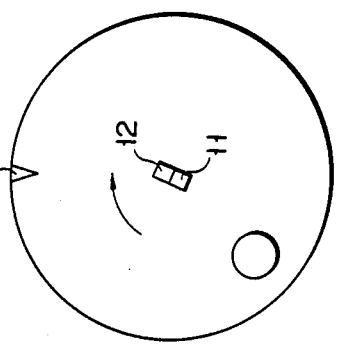
FIG. 2B
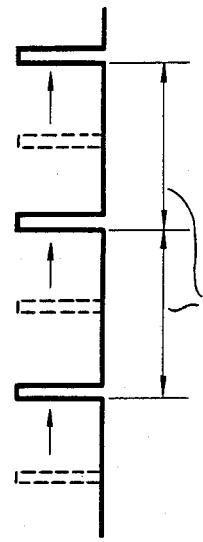
FIG. 3B
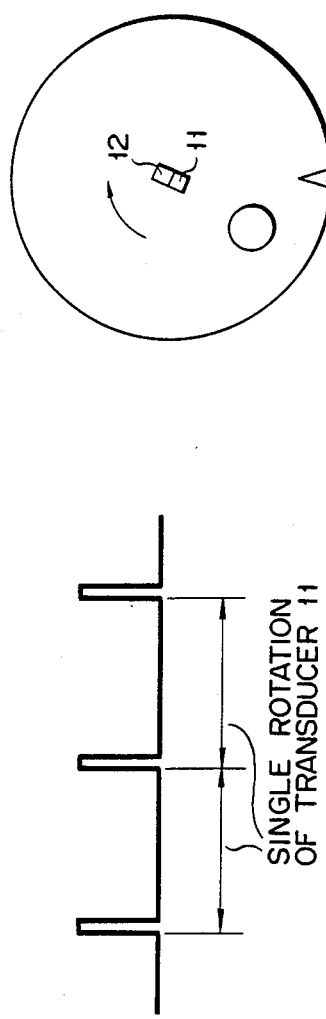
FIG. 2A
FIG. 3A

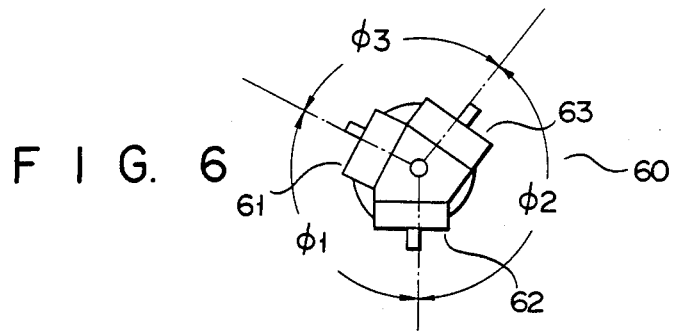
F I G. 6
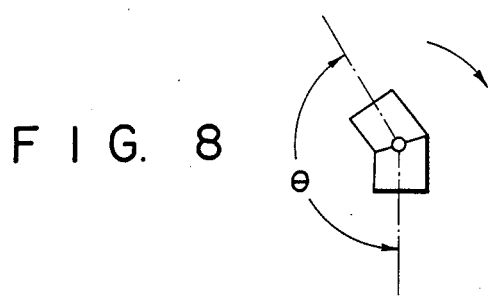
F I G. 8
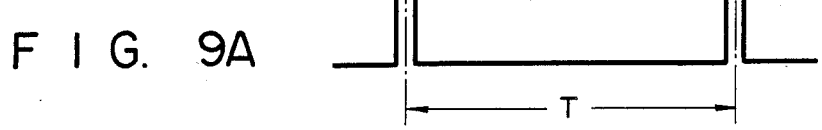
F I G. 9A
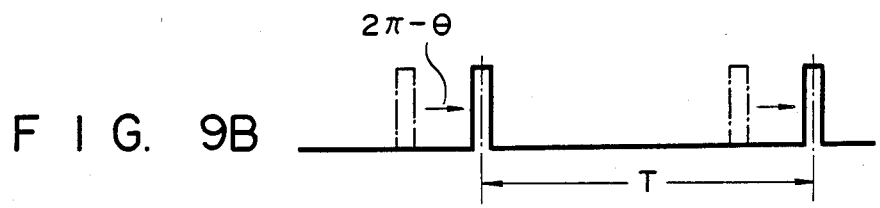
F I G. 9B

ULTRASONIC IMAGING APPARATUS

BACKGROUND OF THE INVENTION

The present invention relates to an ultrasonic imaging apparatus and, more particularly, to an ultrasonic imaging apparatus for a mechanical scanning system using a plurality of ultrasonic transducer elements.

An ultrasonic imaging apparatus is used in ultrasonic diagnosis equipment. The ultrasonic imaging apparatus can employ a sector scanning system for sector-scanning an object to be examined and a radial scanning system for 360°-scanning an object to be examined. The ultrasonic imaging apparatus of the radial scanning system is used together with an endoscope, so that an object to be examined in a body cavity is scanned through 360° about an ultrasonic transducer, thus providing a tomographic image.

In an endoscopic ultrasonic diagnosis apparatus, an ultrasonic transducer is rotatably arranged at the distal end portion of an endoscope, the distal end portion of the endoscope is inserted in a body cavity, and the ultrasonic transducer is rotated. Ultrasonic wave transmission/reception operations are performed 512 times per rotation of the ultrasonic transducer to radially scan the object. An image signal obtained by the radial scan is displayed as a tomographic image.

In the ultrasonic diagnosis apparatus of the radial scanning type, an ultrasonic diagnosis apparatus which can arbitrarily switch a focal length of an ultrasonic wave has been developed. With this ultrasonic diagnosis apparatus, a rotary ultrasonic transducer comprises a plurality of ultrasonic transducer elements which are divisionally arranged in the circumferential direction, and have different ultrasonic characteristics such as a resonance frequency. The ultrasonic transducer elements are switched in accordance with the ultrasonic focal length.

According to the apparatus which switches the transducer elements, assume that a given ultrasonic transducer element is switched to another one in order to change a focal point when an object is scanned with an ultrasonic beam from the given transducer element and an image of the object is displayed on a monitor. In this case, the position of the object displayed on the monitor is undesirably changed in correspondence with the position of the switched transducer element. For example, if transducer elements A and B are arranged to be separated by an angular interval of 180°, an object image obtained by transducer B is displayed at a position separated from an object image obtained by transducer element A by an angular interval of 180°.

SUMMARY OF THE INVENTION

It is an object of the present invention to provide an ultrasonic imaging apparatus wherein a display position of an object on a monitor is not changed even if a plurality of ultrasonic transducer elements arranged along the circumferential direction are switched.

According to the present invention, an ultrasonic transducer comprises a plurality of transducer elements which are divisionally arranged along the circumferential direction and have different ultrasonic characteristics, and is rotated by a motor. A rotary encoder coupled to the motor generates a plurality of pulses including a pulse corresponding to a predetermined rotational position per rotation of the transducer. An encoder control circuit coupled to the rotary encoder outputs a writing start position pulse and a plurality of timing pulses corresponding to scanning lines in response to the pulse corresponding to the predetermined rotational position.

The ultrasonic transducer elements are selectively switched by a switching means. An image signal obtained by the selected ultrasonic transducer element is stored in a memory. A writing start address of the memory is determined by the writing start position pulse which is output in correspondence to the selected transducer element.

BRIEF DESCRIPTION OF THE DRAWINGS

FIG. 1 is a block diagram of an ultrasonic imaging apparatus according to an embodiment of the present invention;

FIG. 2A is a waveform chart of a drive pulse for driving a first transducer element;

FIG. 2B is a view showing the relationship between a first transducer element and a write start position;

FIG. 3A is a waveform chart of a drive pulse for driving a second transducer element;

FIG. 3B is a view showing the relationship between the second transducer element and the writing start position;

FIG. 6 is a plan view of an ultrasonic transducer comprising three ultrasonic transducer elements;

FIG. 8 is a plan view of two adjacent transducer elements of the transducer shown in FIG. 6; and FIGS. 9A and 9B are waveform charts of drive pulses for driving first and second transducer elements shown in FIG. 8.

DETAILED DESCRIPTION OF THE PREFERRED EMBODIMENTS

Figure 4:
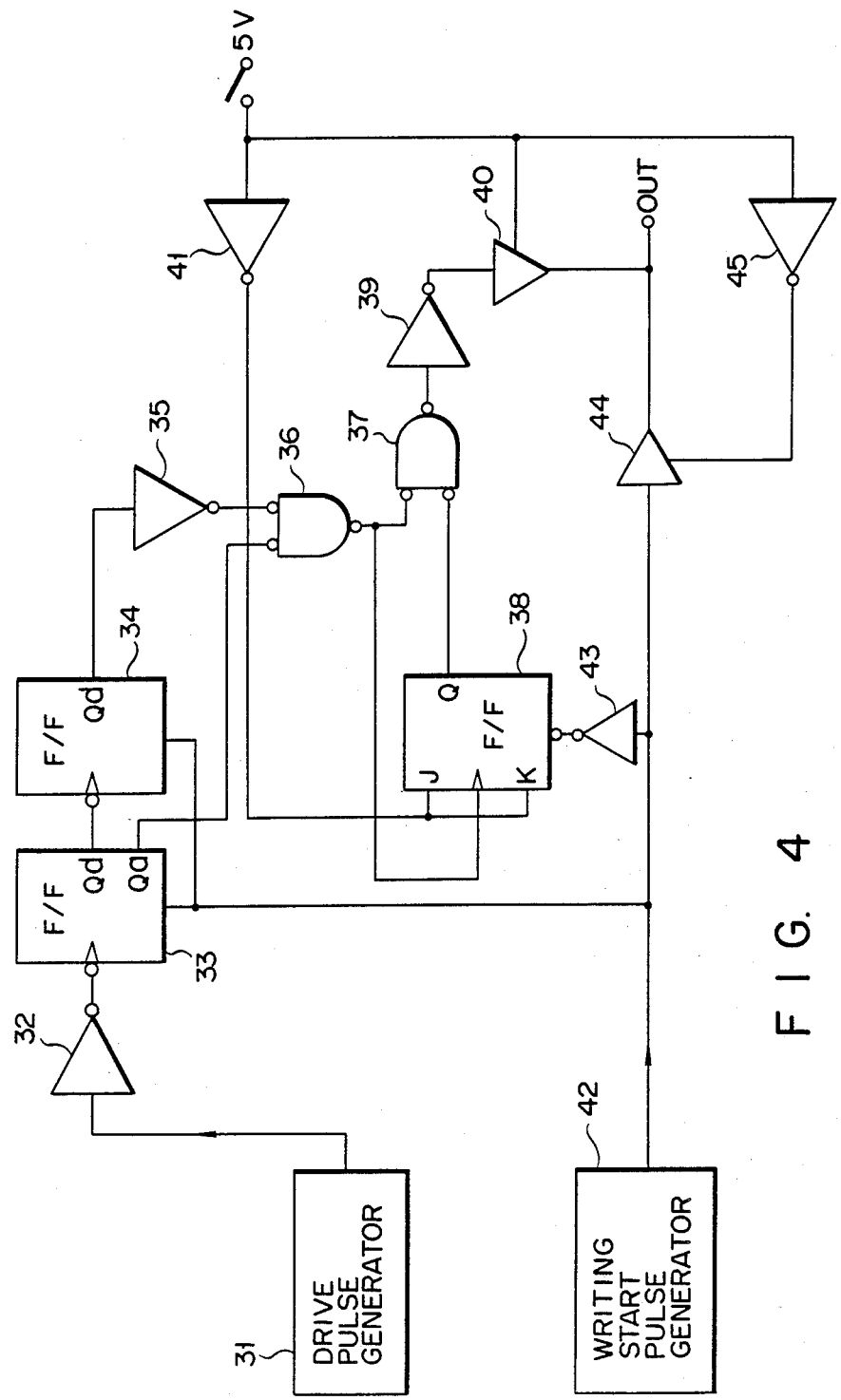
FIG. 4 is a circuit diagram of a writing start position correction circuit.

Referring to FIG. 1, ultrasonic transducer 10 comprises two ultrasonic transducer elements 11 and 12 which are disposed on the distal end portion of an endoscope and are coupled so that their back surfaces face each other. Ultrasonic transducer 10 is fixed to transducer holding member 13. Transducer holding member 13 is coupled to motor 15 to be rotated thereby.

Motor 15 is coupled to rotary encoder 16. Rotary encoder 16 outputs a plurality of, e.g., 256 signals, per rotation of transducer 10 (per rotation of motor), and outputs a reference position signal corresponding to a predetermined rotational position per rotation.

Transducer elements 11 and 12 are connected to amplifier 17 through signal lines 14a and 14b. Amplifier 17 is connected to pulser 18, and has a function of amplifying a drive pulse from pulser 18 and of amplifying an echo signal from transducer elements 11 and 12. An image signal output terminal of amplifier 17 is connected to memory 21 through signal processing circuit 20 of monitoring device 19. An address terminal of memory 21 is connected to the output terminal of address circuit 22, and its readout terminal is connected to monitor 23.

Drive circuit 24 is connected to the input terminal of pulser 18 through switch circuit 25, and outputs a drive control signal for controlling ultrasonic transducer 10.

The output terminal of rotary encoder 16 is connected to the input terminal of encoder control circuit 26. Encoder control circuit 26 waveshapes the output signals from rotary encoder 16, and controls motor 15. The output terminal of encoder control circuit 26 is connected to the input terminal of writing start address correction circuit 27. Writing start address correction circuit 27 corrects a start address for storing an image signal in memory 24 in accordance with the selected one of ultrasonic transducer elements 11 and 12. The output terminals of circuits 26 and 27 are connected to address circuit 22 of monitoring device 21. Encoder control circuit 26 converts 256 output signals from rotary encoder 16 per rotation into 512 pulses, and outputs them to switch circuit 25 as drive timing pulses.

In the above circuit, assume that first ultrasonic transducer element 11 is selected by switch circuit 25, and the apparatus is started. Encoder control circuit 26 drives motor 15. Motor 15 is rotated at a predetermined speed, and causes ultrasonic transducer 10 to rotate together with transducer holding member 13. At this time, rotary encoder 16 outputs 256 signals per rotation of transducer 10, i.e., per rotation of motor 15, and also outputs the reference position signal per rotation.

Encoder control circuit 26 waveshapes the signals from rotary encoder 16, outputs the reference position signal to address circuit 22 as a start address signal, and converts the 256 signals into 512 pulses and outputs them to switch circuit 25.

Switch circuit 25 sends, to pulser 18 through a signal line, the drive control signal which is output from drive circuit 24 in synchronism with the timing pulses from circuit 26 and is suitable for driving ultrasonic transducer element 11. Pulser 18 outputs a drive pulse in response to the drive control signal. The drive pulse is amplified to a predetermined level by amplifier 17, and is supplied to first transducer element 11 through first line 14a.

First transducer element 11 is driven by a drive pulse, and emits an ultrasonic beam. When echoes corresponding to the ultrasonic beams reflected by the object become incident on first transducer element 11, element 11 outputs an echo signal corresponding to the object. The echo signal is amplified by amplifier 17, and is input to signal processing circuit 20 of monitoring device 19. Signal processing circuit 20 processes the echo signal, and outputs the processed signal to memory 21 as image data.

Memory 21 stores image data from an address designated by the start address data from address circuit 22. The start address is determined as follows. FIGS. 2A and 2B respectively show the relationships between first transducer element 11 and the writing start position pulse and between element 11 and first start position POS.1. Position POS.1 coincides with a reference position corresponding to the reference position signal obtained from rotary encoder 16, and the writing start position is determined in correspondence with this position. When motor 15 is rotated, a pulse shown in FIG. 2A is output from rotary encoder 16 each time the reference position, i.e., writing start position POS.1 is detected. When the pulse is input to address circuit 22, circuit 22 determines a start address for storing image data obtained by element 11.

The image data is temporarily stored in memory 21 in accordance with the address data from address circuit 22. The stored image data is read out from memory 21, and is input to monitor 23 to be displayed as an image.

As described above, transmission/reception operations are performed 512 times per rotation of transducer 10, and the resultant image data is input to monitor 23. Then, a concentrical ultrasonic image obtained by radial scanning is displayed on monitor 23.

In a state wherein the image data obtained by element 11 is displayed, when transducer 10 is switched to second transducer element 12 by switch circuit 25 for changing the focal point of the ultrasonic beam, a drive control signal which is output from drive circuit 24 and is suitable for driving element 12 is input to pulser 18 through a signal line. Pulser 18 inputs the drive pulse to element 12 through second line 14b. Element 12 is driven by the drive pulse, and emits an ultrasonic beam toward the object. Reflection waves, i.e., echo waves from the object are converted to an echo signal by element 12, and the echo signal is input to signal processing circuit 20 of monitoring device 19 through amplifier 17.

The echo signal is processed by signal processing circuit 20, and is input to memory 21 as image data. The image data is stored at an address corresponding to the start address from address circuit 22.

Since second transducer element 12 is arranged at a position separated from element 11 by an angular interval of 180°, if the image data obtained by element 12 is stored at the same start address as that for storing the image data obtained by element 11, the stored position is shifted by 180° from an address position at which the image data is to be stored. For this reason, the start address for storing image data obtained by element 12 must be corrected. The correction of the start address is performed by writing start address correction circuit 27.

Figure 5:
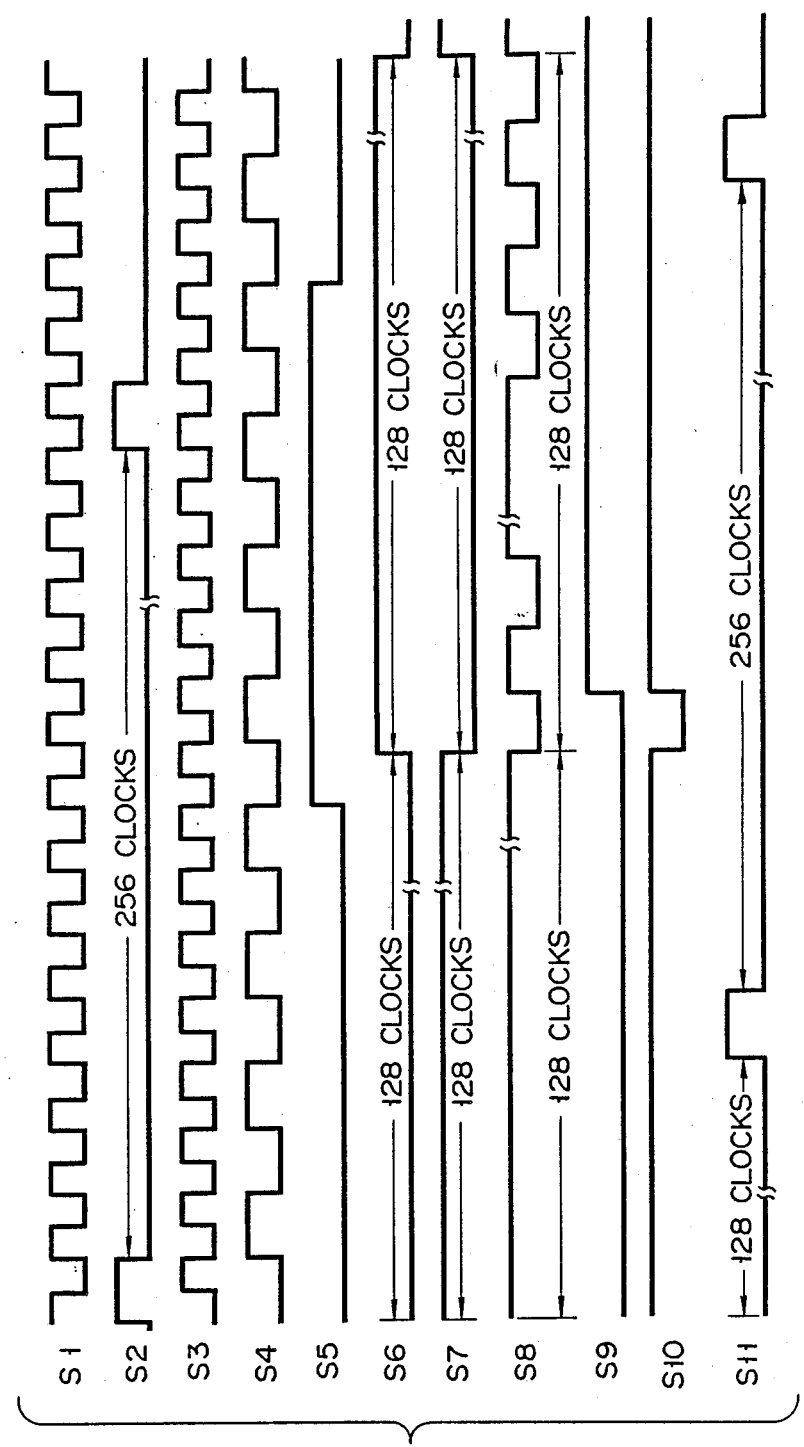
FIG. 5 is a timing chart of respective signals in the circuit shown in FIG. 4.

Writing start address correction circuit 27 is arranged as shown in FIG. 4. As shown in FIG. 5, generator 31 outputs 256 signals per rotation. The output terminal of drive pulse generator 31 is connected to the clock input terminal of flip-flop circuit 33 through inverter 32. Output terminal Qd of flip-flop circuit 33 is connected to the clock terminal of flip-flop circuit 34. Output terminal Qd of flip-flop circuit 34 is connected to the first input terminal of NAND gate 36 through inverter 35. The second input terminal of NAND gate 36 is connected to output terminal Qa of flip-flop circuit 33.

The output terminal of two-negative input NAND gate 36 is connected to the first input terminal of two-negative input NAND gate 37. The second input terminal of NAND gate 37 is connected to output terminal Q of flip-flop circuit 38, and its output terminal is connected to three-state buffer 40 through inverter 39. Three-state buffer 40 is connected to the output terminal, i.e., address circuit 22. The J and K terminals of flip-flop circuit 38 receive +5V voltage through inverter 41.

Writing start position pulse generator 42 includes rotary encoder 16 and encoder control circuit 26, and outputs a pulse signal corresponding to a reference position (first position POS.1). The output terminal of pulse generator 42 is connected to flip-flop circuits 33 and 34, and to flip-flop circuit 38 through inverter 43. The output terminal of pulse generator 42 is connected to output terminal OUT through three-state buffer 44. Buffer 44 receives a +5V voltage through inverter 45.

The operation of the circuit shown in FIG. 4 will now be described with reference to the timing chart shown in FIG. 5. When drive pulse generator 31 outputs pulse signal S1, pulse signal S1 is inverted by inverter 32, and is input to flip-flop circuit 33 as signal S3. Flip-flop circuit 33 outputs pulse signals S4 and S5 from output terminals Qa and Qb in association with write start position signal S2 and signal S3.

Flip-flop circuit 34 outputs signal S6 in response to signal S5 in association with signal S2. Signal S6 is inverted by inverter 35, and is input to NAND gate 36 as signal S7. NAND gate 36 calculates a NAND product between signals S4 and S7 by negative inputs, and outputs signal S8.

Output signal S8 is input to NAND gate 37 together with output signal S9 from flip-flop circuit 38. NAND gate 37 outputs signal S10. Signal S10 is output to output terminal OUT through inverter 39 and buffer 40. Signal S11 is supplied to address circuit 22 through output terminal OUT. Signal S11 is delayed from write start signal S2 by 128 clocks, and this delay time corresponds to 180° rotation. Thus, the writing start position for second transducer element 12 corresponds to position POS.2 shown in FIG. 3B. More specifically, as shown in FIG. 3A, signal S11 is phase-delayed by 180° from a signal shown in FIG. 2A. When signal S11 is input to address circuit 22, address circuit 22 writes first image data at an address shifted by 180°. Thus, upon switching of transducer elements, image data will not be stored at an address shifted from a true storage position.

FIG. 6 shows ultrasonic transducer 60 constituted by three ultrasonic transducer elements 61, 62, and 63 which are shifted by angles $\phi 1$, $\phi 2$, and $\phi 3$. When transducer 60 is used, a start address is determined by using a writing start address correction circuit shown in FIG. 7A.

With this circuit, start position pulse generator 51 and drive pulse generator 52 are connected to PPI (plan position indicator) 54. PPI 54 is connected to CPU 55, and forms a correction start position pulse in association with CPU 55, a program stored in ROM 56 connected to CPU 55, and RAM 57 connected to CPU 55.

Figure 7A:
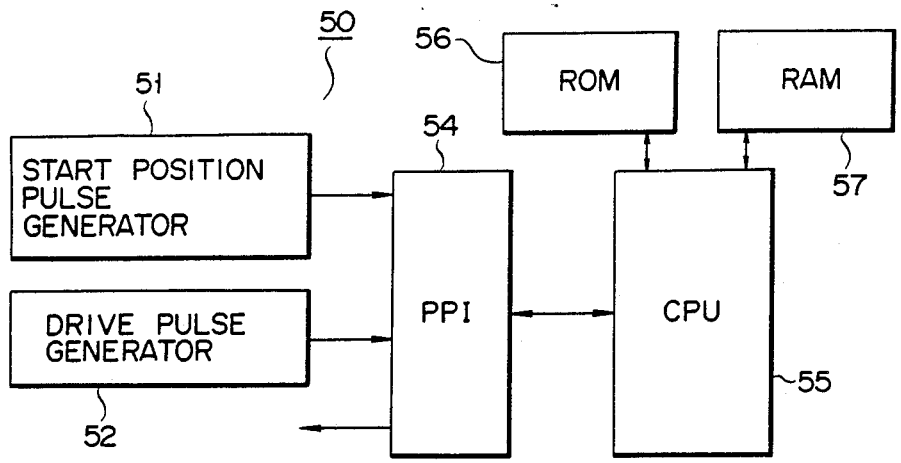
FIG. 7A is a block circuit diagram of a writing start position correction circuit used in an ultrasonic imaging apparatus according to another embodiment using the ultrasonic transducer shown in FIG. 6.
Figure 7B:
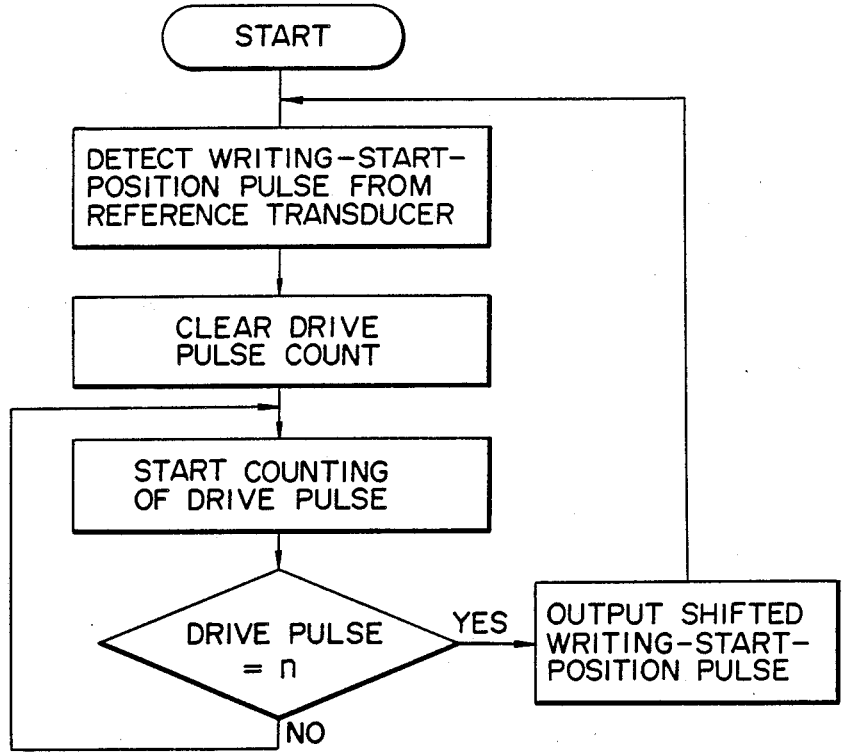
FIG. 7B is a flow chart for explaining the operation of the circuit shown in FIG. 7A.

In the flow chart shown in FIG. 7B, when the circuit shown in FIG. 7A is started, writing start position signal is output from pulse generator 51 to PPI 54. When CPU 55 detects the start position signal, it clears a drive pulse counter. Thereafter, 512 pulses per rotation output from pulse generator 512 are counted. A count value is compared with value n. If a coincidence therebetween is established, a writing start position pulse corresponding to a correction position is output. If the count value is not equal to value n (n: the number of drive pulses which corresponds to angle $\phi 1$, $\phi 2$ or $\phi 3$), the drive pulse is again counted. More specifically, the writing start position signal is generated each time 512 drive pulses are generated from drive pulse generator 52. When transducer element 62 is shifted from reference transducer element 61 by angle $\phi 1$, a pulse shifted by the number of drive pulses corresponding to $512 \times \phi \frac{1}{2} \pi$ is output as corrected start position pulse 53.

In this manner, the corrected start position pulse with respect to the reference transducer element is formed. The writing start position pulses formed as described above are stored in RAM 57. In this case, the positional relationship among the transducer elements is determined so that the writing start position pulses written in RAM 57 always have the predetermined address relationship. For example, assume that second transducer element 62 is arranged to be shifted from first transducer element 61 by angle $\theta$, as shown in FIG. 8. FIG. 9A shows the writing start position pulse for first transducer element 61 in this case. In contrast to this, the writing start position pulse for transducer element 62 is a pulse shifted from the start position pulse shown in FIG. 9A by $(2-\theta)$. This shift amount corresponds to $n \times \theta / 2\theta$ pulses if n pulses are generated during one period (T).

The writing start address is changed in accordance with the shift amount for the reference ultrasonic transducer element in this manner. Therefore, even if the ultrasonic transducer elements are arbitrarily switched, the image data can be stored in the memory and displayed in correspondence with the position of an actual object.

What is claimed is:

1. An ultrasonic imaging apparatus comprising: ultrasonic transducer means which is rotatably arranged and includes a plurality of ultrasonic transducer elements arranged in a circumferential direction, to perform a radial scan;
   transducer rotating means for rotating said transducer means;
   switching means for selectively switching said transducer elements, to select one of said transducer elements in accordance with a focal length of an ultrasonic wave, at any randomly selected position of said ultrasonic transducer means;
   transducer driving means for driving the selected one of said ultrasonic transducer elements, to instantaneously scan different sectors after the switching of said transducer elements and to emit an ultrasonic beam therefrom and output echo signals corresponding to echoes;
   processing means for signal-processing said echo signals and converting said echo signals into an image signal;
   address means for outputting writing start address data corresponding to the selected one of said transducer elements; and
   memory means for storing said image signal at an address corresponding to the writing start address data output from said address means whereby said image signal will be stored in a correct address in said memory means when said transducer means is randomly switched to change a focal length of said transducer.

2. An apparatus according to claim 1, wherein said ultrasonic transducer means includes first and second transducer elements, and said address means comprises reference output means for generating a reference pulse per rotation of said ultrasonic transducer means rotated by said driving means, means for converting the reference pulse output from said reference output means into a start address for storing image data obtained by said first transducer element, and means for determining, from the reference pulse, the start address for storing the image data obtained by said second transducer element in accordance with position data of said second transducer element with respect to said first transducer element.

3. An apparatus according to claim 2, wherein said reference output means includes rotary encoder means, coupled to said driving means, for outputting pulses including said reference pulse upon rotation of said driving means.

4. An apparatus according to claim 1, wherein said ultrasonic transducer means comprises the ultrasonic transducer elements including a single reference transducer element and other transducer elements, and said address means comprises means for calculating address data in accordance with angle data of said other transducer elements with respect to said reference transducer element and data representing the number of driving pulses output from said driving means during a single rotation of said transducer means.

5. An apparatus according to claim 1, wherein said ultrasonic transducer elements comprise the ultrasonic transducer elements having different focal lengths and ultrasonic characteristics including a resonance frequency.

6. An apparatus according to claim 1, wherein said transducer driving means comprises means for supplying a plurality of drive pulses to a selected one of said ultrasonic transducer elements during a single rotation of said transducer means.

7. An apparatus according to claim 6, wherein said transducer driving means comprises means for generating 512 drive pulses during the single rotation.

8. An apparatus according to claim 6, wherein said ultrasonic transducer elements comprise two ultrasonic transducer elements arranged to be shifted by 180° in the rotating direction.

9. An apparatus according to claim 1, wherein said ultrasonic transducer means comprises an ultrasonic transducer rotatably arranged on an endoscope.

10. An apparatus according to claim 1, further comprising display means, coupled to said memory means, for displaying image data stored in said memory means.

* * * * *